United States Patent
Kwon

(10) Patent No.: US 10,190,418 B2
(45) Date of Patent: Jan. 29, 2019

(54) GAS TURBINE ENGINE AND TURBINE BLADE

(71) Applicant: ROLLS-ROYCE NORTH AMERICAN TECHNOLOGIES, INC., Indianapolis, IN (US)

(72) Inventor: Okey Kwon, Indianapolis, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 581 days.

(21) Appl. No.: 14/367,477

(22) PCT Filed: Dec. 28, 2012

(86) PCT No.: PCT/US2012/072161
§ 371 (c)(1),
(2) Date: Jun. 20, 2014

(87) PCT Pub. No.: WO2013/102135
PCT Pub. Date: Jul. 4, 2013

(65) Prior Publication Data
US 2014/0311164 A1    Oct. 23, 2014

Related U.S. Application Data

(60) Provisional application No. 61/581,541, filed on Dec. 29, 2011.

(51) Int. Cl.
*F01D 5/18* (2006.01)
*F01D 5/20* (2006.01)
*F01D 11/08* (2006.01)

(52) U.S. Cl.
CPC ............. *F01D 5/18* (2013.01); *F01D 5/20* (2013.01); *F01D 11/08* (2013.01);
(Continued)

(58) Field of Classification Search
CPC ... F01D 5/18; F01D 5/186; F01D 5/20; F01D 11/08; F01D 11/10; Y02T 50/676; F05D 2240/304–2240/307
See application file for complete search history.

(56) References Cited

U.S. PATENT DOCUMENTS 4,424,001 A * 1/1984 North .................. F01D 5/20
                                                415/115
5,261,789 A * 11/1993 Butts .................. F01D 5/186
                                                415/115

(Continued)

OTHER PUBLICATIONS

PCT International Search Report and Written Opinion completed by the ISA/US on Apr. 25, 13 and issued in connection with PCT/US2012/072161.

(Continued)

*Primary Examiner* — Gerald L Sung
*Assistant Examiner* — Alain Chau
(74) *Attorney, Agent, or Firm* — Barnes & Thornburg LLP

(57) ABSTRACT

One embodiment of the present invention is a unique turbine blade for a gas turbine engine. Another embodiment is a unique gas turbine engine. Other embodiments include apparatuses, systems, devices, hardware, methods, and combinations for gas turbine engines and turbine blades for gas turbine engines. Further embodiments, forms, features, aspects, benefits, and advantages of the present application will become apparent from the description and figures provided herewith.

15 Claims, 3 Drawing Sheets

(52) U.S. Cl.
CPC .. *F05D 2240/304* (2013.01); *F05D 2240/305* (2013.01); *F05D 2240/306* (2013.01); *F05D 2240/307* (2013.01); *F05D 2260/202* (2013.01); *Y02T 50/676* (2013.01)

(56) References Cited

U.S. PATENT DOCUMENTS

| | | | |
|---|---|---|---|
| 5,263,820 A | 11/1993 | Tubbs | |
| 5,564,902 A | 10/1996 | Tomita | |
| 6,039,531 A * | 3/2000 | Suenaga | F01D 5/186 415/115 |
| 6,059,530 A * | 5/2000 | Lee | F01D 5/145 416/96 A |
| 6,086,328 A * | 7/2000 | Lee | F01D 5/18 415/115 |
| 6,164,914 A * | 12/2000 | Correia | F01D 5/186 415/115 |
| 6,179,556 B1 * | 1/2001 | Bunker | F01D 5/187 415/115 |
| 6,190,129 B1 | 2/2001 | Mayer et al. | |
| 6,382,913 B1 | 5/2002 | Lee et al. | |
| 6,554,575 B2 | 4/2003 | Leeke et al. | |
| 6,595,749 B2 | 7/2003 | Lee et al. | |
| 6,991,430 B2 | 1/2006 | Stec et al. | |
| 7,059,834 B2 | 6/2006 | Chlus et al. | |
| 7,118,342 B2 | 10/2006 | Lee et al. | |
| 7,287,959 B2 | 10/2007 | Lee et al. | |
| 7,473,073 B1 * | 1/2009 | Liang | F01D 5/20 415/173.5 |
| 7,934,906 B2 * | 5/2011 | Gu | F01D 5/187 416/97 R |
| 8,016,562 B2 * | 9/2011 | Gu | F01D 5/187 416/97 R |
| 8,113,779 B1 * | 2/2012 | Liang | F01D 5/20 416/92 |
| 8,182,221 B1 * | 5/2012 | Liang | F01D 5/087 415/115 |
| 8,951,008 B2 * | 2/2015 | Cornelius | F01D 5/20 29/889.7 |
| 9,085,988 B2 * | 7/2015 | Kwon | F01D 5/20 |
| 2004/0197190 A1 * | 10/2004 | Stec | F01D 5/141 416/97 R |
| 2007/0258815 A1 | 11/2007 | Liang | |
| 2008/0118367 A1 | 5/2008 | Liang et al. | |
| 2010/0303625 A1 | 12/2010 | Kuhne et al. | |
| 2011/0176929 A1 | 7/2011 | Ammann et al. | |
| 2013/0302166 A1 * | 11/2013 | Lee | B23P 6/002 416/95 |

OTHER PUBLICATIONS

Supplementary European Search Report for Application No. 12862556. 3-1610, dated Jun. 30, 2017, 9 pages.

Extended European Search Report, European Application No. 12862556. 3-1610 / 2798175, dated Jun. 30, 2017, 9 pages.

Search Report for Canadian Application No. 2859993, dated Sep. 26, 2018, 4 pages.

* cited by examiner

GAS TURBINE ENGINE AND TURBINE BLADE

CROSS REFERENCE TO RELATED APPLICATIONS

This application is a U.S. national counterpart application of international application serial No. PCT/US2012/072161 filed Dec. 28, 2012, which claims priority under 35 USC § 119(e) to U.S. Provisional Patent Application No. 61/581,541 filed Dec. 29, 2011, the entire disclosures of which are incorporated herein by reference.

FIELD OF THE INVENTION

The present invention relates to gas turbine engines, and more particularly, gas turbine engines and turbine blades for gas turbine engines.

BACKGROUND

Gas turbine engine turbine blades that effectively cool the blade tip and trailing edge remain an area of interest. Some existing systems have various shortcomings, drawbacks and disadvantages relative to certain applications. Accordingly, there remains a need for further contributions in this area of technology.

SUMMARY

One embodiment of the present invention is a unique turbine blade for a gas turbine engine. Another embodiment is a unique gas turbine engine. Other embodiments include apparatuses, systems, devices, hardware, methods, and combinations for gas turbine engines and turbine blades for gas turbine engines. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
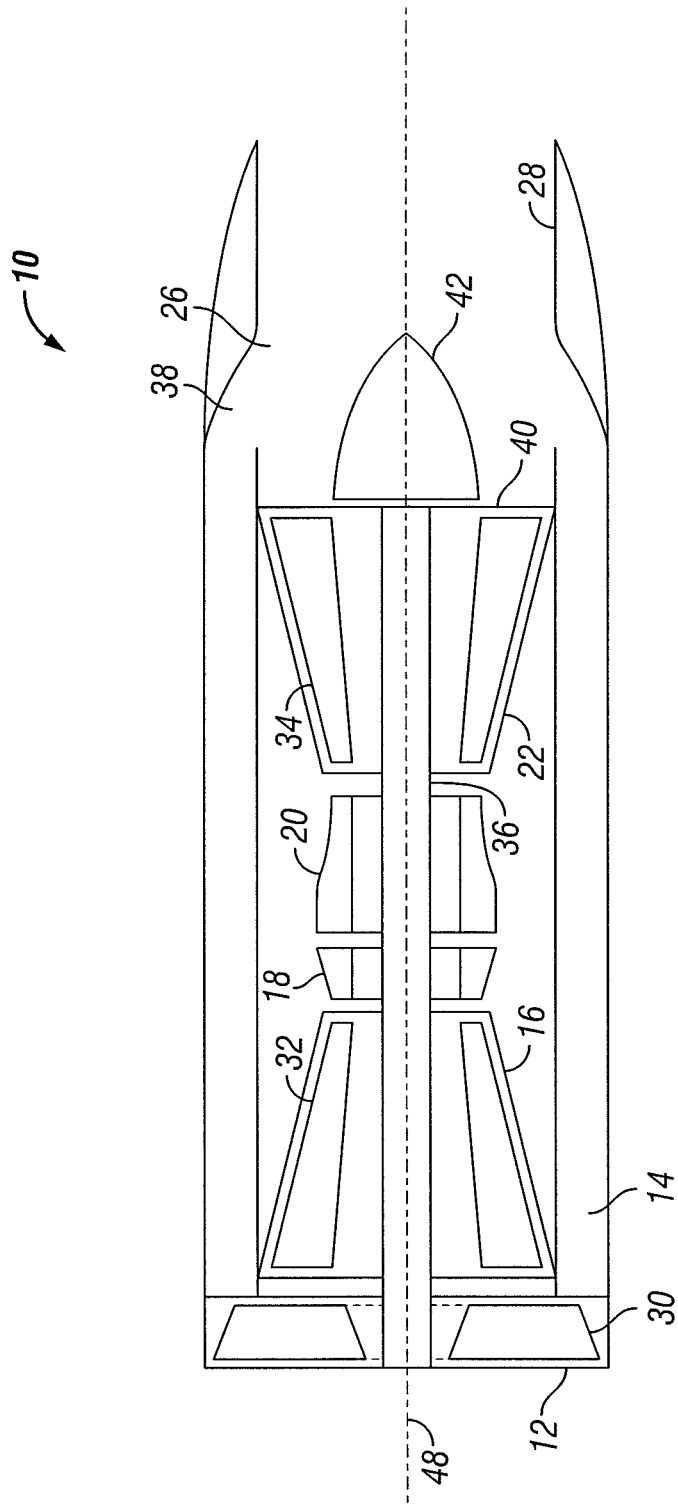
FIG. 1 schematically illustrates some aspects of a non-limiting example of a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, some aspects of a non-limiting example of a gas turbine engine 10 in accordance with an embodiment of the present invention is schematically depicted. In one form, gas turbine engine 10 is an aircraft propulsion power plant. In other embodiments, gas turbine engine 10 may be a land-based or marine engine. In one form, gas turbine engine 10 is a multi-spool turbofan engine. In other embodiments, gas turbine engine 10 may take other forms, and may be, for example, a turboshaft engine, a turbojet engine, a turboprop engine, or a combined cycle engine having a single spool or multiple spools.

As a turbofan engine, gas turbine engine 10 includes a fan system 12, a bypass duct 14, a compressor system 16, a diffuser 18, a combustion system 20, a turbine system 22, a discharge duct 26 and a nozzle system 28. Bypass duct 14 and compressor system 16 are in fluid communication with fan system 12. Diffuser 18 is in fluid communication with compressor system 16. Combustion system 20 is fluidly disposed between compressor system 16 and turbine system 22. In one form, combustion system 20 includes a combustion liner (not shown) that contains a continuous combustion process. In other embodiments, combustion system 20 may take other forms, and may be, for example and without limitation, a wave rotor combustion system, a rotary valve combustion system or a slinger combustion system, and may employ deflagration and/or detonation combustion processes.

Fan system 12 includes a fan rotor system 30. In various embodiments, fan rotor system 30 includes one or more rotors (not shown) that are powered by turbine system 22. Bypass duct 14 is operative to transmit a bypass flow generated by fan system 12 to nozzle 28. Compressor system 16 includes a compressor rotor system 32. In various embodiments, compressor rotor system 32 includes one or more rotors (not shown) that are powered by turbine system 22. Each compressor rotor includes a plurality of rows of compressor blades (not shown) that are alternatingly interspersed with rows of compressor vanes (not shown). Turbine system 22 includes a turbine rotor system 34. In various embodiments, turbine rotor system 34 includes one or more rotors (not shown) operative to drive fan rotor system 30 and compressor rotor system 32. Each turbine rotor includes a plurality of turbine blades (not shown) that are alternatingly interspersed with rows of turbine vanes (not shown).

Turbine rotor system 34 is drivingly coupled to compressor rotor system 32 and fan rotor system 30 via a shafting system 36. In various embodiments, shafting system 36 includes a plurality of shafts that may rotate at the same or different speeds and directions. In some embodiments, only a single shaft may be employed. Turbine system 22 is operative to discharge an engine 10 core flow to nozzle 28.

In one form, fan rotor system 30, compressor rotor system 32, turbine rotor system 34 and shafting system 36 rotate about an engine centerline 48. In other embodiments, all or parts of fan rotor system 30, compressor rotor system 32, turbine rotor system 34 and shafting system 36 may rotate about one or more other axes of rotation in addition to or in place of engine centerline 48.

Discharge duct 26 extends between a bypass duct discharge portion 38, a discharge portion 40 of turbine system 22 and engine nozzle 28. Discharge duct 26 is operative to direct bypass flow and core flow from bypass duct discharge portion 38 and turbine discharge portion 40, respectively, into nozzle system 28. In some embodiments, discharge duct 26 may be considered a part of nozzle 28. Nozzle 28 is in fluid communication with fan system 12 and turbine system 22. Nozzle 28 is operative to receive the bypass flow from fan system 12 via bypass duct 14, and to receive the core flow from turbine system 22, and to discharge both as an engine exhaust flow, e.g., a thrust-producing flow. In other embodiments, other nozzle arrangements may be employed, including separate nozzles for each of the core flow and the bypass flow.

During the operation of gas turbine engine 10, air is drawn into the inlet of fan 12 and pressurized by fan 12. Some of the air pressurized by fan 12 is directed into compressor system 16 as core flow, and some of the pressurized air is directed into bypass duct 14 as bypass flow, which is discharged into nozzle 28 via discharge duct 26. Compressor system 16 further pressurizes the portion of the air received therein from fan 12, which is then discharged into diffuser 18. Diffuser 18 reduces the velocity of the pressurized air, and directs the diffused core airflow into combustion system 20. Fuel is mixed with the pressurized air in combustion system 20, which is then combusted. The hot gases exiting combustion system 20 are directed into turbine system 22, which extracts energy in the form of mechanical shaft power sufficient to drive fan system 12 and compressor system 16 via shafting system 36. The core flow exiting turbine system 22 is directed along an engine tail cone 42 and into discharge duct 26, along with the bypass flow from bypass duct 14. Discharge duct 26 is configured to receive the bypass flow and the core flow, and to discharge both into nozzle 28 as an engine exhaust flow, e.g., for providing thrust, such as for aircraft propulsion.

Turbine rotor system 34 includes a plurality of blades (not shown in FIG. 1) employed to extract energy from the high temperature high pressure gases in the engine 10 flowpath downstream of combustion system 20. It is desirable to maintain the temperature of blades within certain temperature limits, e.g., based on the materials and coatings employed in or on the blades. In many cases, turbine blades are cooled by injecting cooling air into the blade. For many blades, the trailing edge, and in particular, the trailing edge portion at the blade tip is difficult to cool. A lack of adequate cooling may result in or increase the likelihood of oxidation and/or corrosion damage, and/or erosion of the blade tip trailing edge. In order to provide cooling to the trailing edge portion of the blade tip, embodiments of the present invention employ a novel tip cooling and squealer tip configuration.

Figure 2:
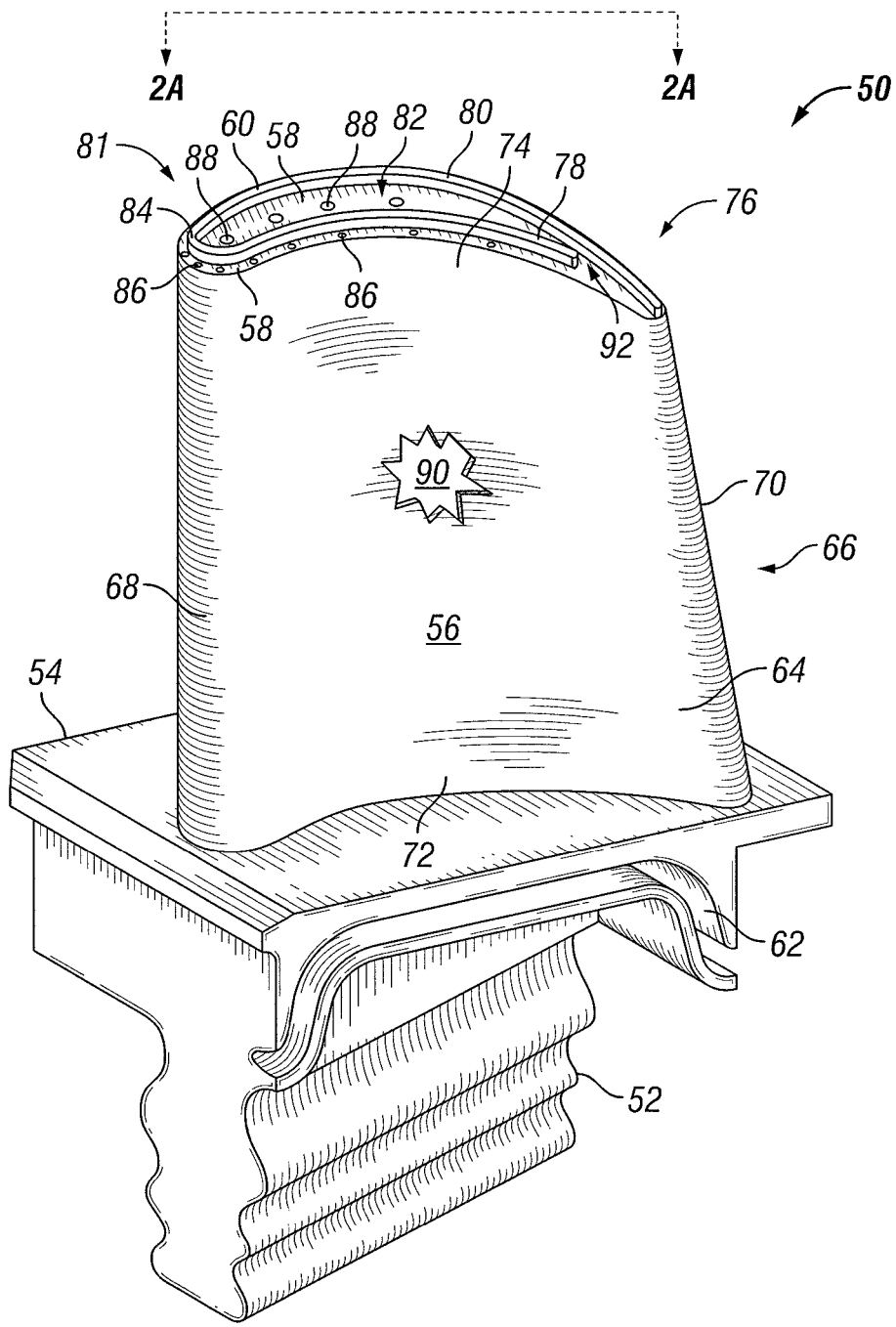
FIG. 2 illustrates some aspects of a non-limiting example of a turbine blade in accordance with an embodiment of the present invention.

Referring to FIG. 2, some aspects of a non-limiting example of a turbine blade 50 in accordance with an embodiment of the present invention are illustrated. Turbine blade 50 includes a blade attachment feature 52, a blade platform 54, an airfoil body 56 culminating in a tip surface 58, and a squealer tip 60 extending from tip surface 58. Attachment feature 52 is configured to attached blade 50 to a turbine disk. Blade platform 54 extends from attachment feature 52. Blade platform 54 is configured to form an inner gas flowpath boundary in conjunction with the blade platforms of the adjacent and other blades in the same turbine blade stage as the depicted blade 50. In some embodiments, blade 50 may include one or more grooves 62 on each side of the blade for receiving interblade seals and/or dampers (not shown) for sealing between blades 50 and/or damping blades 50.

Airfoil body 56 extends radially outward of platform 54, e.g., in a direction substantially perpendicular to engine centerline 48. Airfoil body 56 includes a pressure side 64, a suction side 66, a leading edge 68 and a trailing edge 70. Airfoil body 56 extends from a root portion 72 to a tip portion 74, including a trailing edge tip portion 76. Trailing edge tip portion 76 is formed, in part, by squealer tip 60. Squealer tip 60 extends outwardly from tip surface 58, e.g., radially outward in a direction substantially perpendicular to engine centerline 48. Squealer tip 60 includes a pressure side rail portion 78 and a suction side rail portion 80. Pressure side rail portion 78 and suction side rail portion 80 form therebetween a cavity 82 adjacent to and radially bounded on its bottom by tip surface 58. Cavity 82 is disposed between pressure side rail portion 78 and suction side rail portion 80. In one form, suction side rail portion 80 extends to trailing edge 70. In one form, pressure side rail 78 does not extend to trailing edge 70. In other embodiments, either or both of pressure side rail portion 78 and suction side rail portion 80 may or may not extend to trailing edge 70.

Disposed at a leading edge tip portion 81 of airfoil body 56 is a leading edge rail portion 84 of squealer tip 60. Pressure side rail portion 78 and suction side rail portion 80 are joined together by leading edge rail portion 84. Leading edge rail portion 84 further forms cavity 82, bounding cavity 82 at leading edge tip portion 81.

Figure 2A:
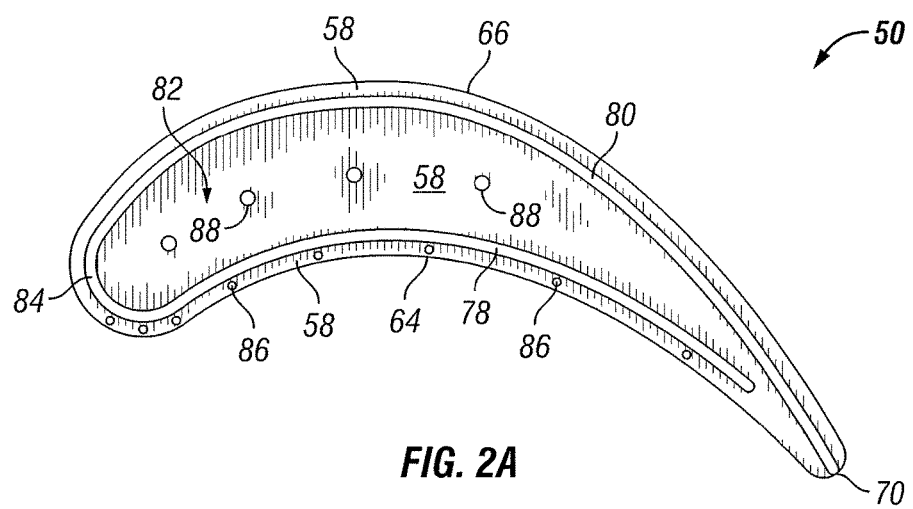
FIG. 2A depicts some aspects of another non-limiting example of a turbine blade in accordance with an embodiment of the present invention.

In one form, squealer tip 60 is offset from pressure side 64 of airfoil body 56. In particular, in one form, pressure side rail portion 78 is offset along tip surface 58 of airfoil body 56 from pressure side 64. In one form, squealer tip 60 extends outward from tip surface 58 at suction side 66, i.e., suction side rail portion 80 is not offset from suction side 66. In other embodiments, squealer tip 60 may be offset from suction side 66, e.g., wherein suction side rail portion 80 is offset along tip surface 58 from suction side 66 of airfoil body 56, e.g., as depicted in FIG. 2A. In one form, a plurality of openings 86 are disposed in tip surface 58 in the tip surface 58 land extending between the pressure side 64 surface of airfoil body 56 and pressure side rail portion 78 and in the tip surface 58 land extending between leading edge 68 and leading edge rail portion 84. In embodiments having an offset suction side rail portion, openings 88 may also be included in tip surface 58 in the tip surface 58 land extending between the suction side 66 surface of airfoil body 56 and suction side rail portion 80. Openings 86 are configured to discharge air from tip surface 58, e.g., cooling air and/or purge air. In one form, a plurality of openings 88 are disposed in tip surface 58 between pressure side rail portion 78 and suction side rail portion 80 of squealer tip 60. Openings 88 are configured to discharge air from tip surface 58, e.g., cooling air and/or purge air, into cavity 82. Openings 86 and 88 are supplied with air via one or more internal passages 90 disposed within blade 50, e.g., within airfoil body 56.

Squealer tip 60 includes a passage 92 extending between pressure side rail portion 78 and suction side rail portion 80. Passage 92 is configured to expose trailing edge tip portion 76 to cavity 82, and to distribute air from cavity 82 discharged by openings 88 to trailing edge tip portion 76. In one form, passage 92 is in the form of a gap between pressure side rail portion 78 and suction side rail portion 80 adjacent to trailing edge tip portion 76.

Figure 3:
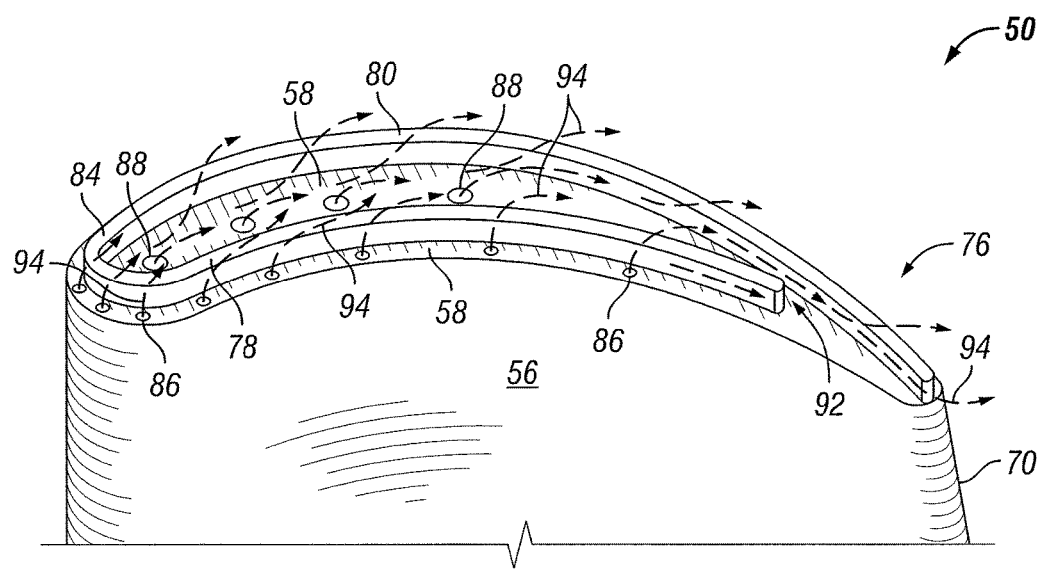
FIG. 3 illustrates some aspects of a non-limiting example of a turbine blade in accordance with an embodiment of the present invention.

Referring to FIG. 3, some aspects of a non-limiting example of a turbine blade 50 in accordance with an embodiment of the present invention are illustrated. In particular, FIG. 3 illustrates examples of potential air flow from openings 86 and 88 that cool squealer tip 60 and trailing edge tip portion 76 during the operation of engine 10. The air flow from openings 86 and 88 is illustrated using arrowed lines 94. From the illustration of FIG. 3, it is seen that the air discharged from openings 86 flows along and over pressure side rail portion 78 and leading edge rail portion 84 of squealer tip 60, providing film cooling to pressure side rail portion 78 and leading edge rail portion 84, and removing heat from pressure side rail portion 78 and leading edge rail portion 84. In some embodiments, air discharged from openings 86 may also flow along pressure side rail portion 78 toward suction side rail portion 80 at trailing edge tip portion 76. Air discharged from openings 88 flows through cavity 82 and along and over suction side side rail portion 80 of squealer tip 60, providing film cooling to suction side rail portion 80, and removing heat from suction side rail portion 80. In particular, it is seen from FIG. 3 that some of the air discharged from openings 88 flows through passage 92 between pressure side rail portion 78 and suction side rail portion 80 of squealer tip 60, providing film cooling to and removing heat from trailing edge tip portion 76, including suction side rail portion 80 and trailing edge 70.

Embodiments of the present invention include a turbine blade for a gas turbine engine, comprising: an airfoil body having a pressure side, a suction side and a trailing edge tip portion, wherein the airfoil body culminates at a tip surface; and a squealer tip extending outwardly from the tip surface and having a pressure side rail portion and a suction side rail portion forming a cavity therebetween, wherein the squealer tip also includes a passage extending between the pressure side rail portion and the suction side rail portion configured to expose the trailing edge tip portion to the cavity; and wherein the pressure side rail portion is offset from the pressure side of the airfoil body.

In a refinement, the passage is a gap between the pressure side rail portion and the suction side rail portion.

In another refinement, the trailing edge tip portion includes a trailing edge; and wherein the suction side rail portion extends to the trailing edge.

In yet another refinement, the trailing edge tip portion includes a trailing edge; and wherein the pressure side rail portion does not extend to the trailing edge.

In still another refinement, the turbine blade further comprises at least one opening disposed in the tip surface between the pressure side of the airfoil body and the pressure side rail portion of the squealer tip, wherein the at least one opening is configured to discharge air from the tip surface.

In yet still another refinement, the at least one opening is a plurality of openings.

In a further refinement, the turbine blade further comprises at least one opening disposed in the tip surface between the pressure side rail portion of the squealer tip and the suction side rail portion of the squealer tip, wherein the at least one opening is configured to discharge air from the tip surface into the cavity.

In a yet further refinement, the at least one opening is a plurality of openings.

In a still further refinement, the passage is configured to distribute air from the cavity to the trailing edge tip portion.

In a yet still further refinement, the airfoil body includes a leading edge tip portion; wherein the squealer tip includes a leading edge rail portion disposed at the leading edge tip portion, and wherein the pressure side rail portion of the squealer tip and the suction side rail portion of the squealer tip are joined together by the leading edge rail portion of the squealer tip.

In another refinement, the leading edge tip portion includes a leading edge, further comprising an opening in the tip surface, wherein the opening is disposed between the leading edge of the airfoil body and the leading edge rail portion of the squealer tip; and wherein the opening is configured to discharge air from the tip surface.

Embodiments of the present invention include a turbine blade for a gas turbine engine, comprising: an airfoil body having a pressure side, a suction side and a trailing edge tip portion, wherein the airfoil body culminates at a tip surface; and a squealer tip extending outwardly from the tip surface, wherein the squealer tip is offset from the pressure side of the airfoil body and extends outward from the tip surface at the suction side of the airfoil body; and wherein the squealer tip is configured to form a cavity therein and a passage exposing the cavity to the trailing edge tip portion.

In a refinement, the squealer tip includes a pressure side rail portion and a suction side rail portion that form the cavity therebetween.

In another refinement, the passage is a gap between the pressure side rail portion and the suction side rail portion.

In yet another refinement, the trailing edge tip portion includes a trailing edge; and wherein the suction side rail portion extends to the trailing edge.

In still another refinement, the airfoil body includes a leading edge tip portion; wherein the squealer tip includes a leading edge rail portion disposed at the leading edge tip portion, and wherein the pressure side rail portion of the squealer tip and the suction side rail portion of the squealer tip are joined together by the leading edge rail portion of the squealer tip.

In yet still another refinement, the turbine blade further comprises a plurality of openings disposed in the tip surface between the pressure side of the airfoil body and the squealer tip, wherein the plurality of openings are configured to discharge air from the tip surface.

In a further refinement, the turbine blade further comprises a plurality of openings disposed in the tip surface and positioned to discharge air from the tip surface into the cavity.

In a yet further refinement, the passage is configured to distribute air from the cavity to the trailing edge tip portion.

Embodiments of the present invention include a gas turbine engine, comprising: a compressor; a combustor in fluid communication with the compressor; and a turbine in fluid communication with the combustor, wherein the turbine includes a plurality of turbine blades, wherein at least one of the turbine blades includes: an airfoil body having a trailing edge tip portion; and means for cooling the trailing edge tip portion.

While the invention has been described in connection with what is presently considered to be the most practical and preferred embodiment, it is to be understood that the invention is not to be limited to the disclosed embodiment (s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A turbine blade for a gas turbine engine, comprising:
an airfoil body having a pressure side, a suction side, a leading edge portion having a leading edge of the airfoil body, and a trailing edge portion having a trailing edge of the airfoil body, wherein the pressure side, leading edge portion, suction side, and trailing edge portion collectively form a continuous outer surface of the airfoil body, and the airfoil body culminates at a tip surface; and
a squealer tip extending outwardly from the tip surface, said squealer tip having a pressure side rail portion extending along the pressure side wall from the leading edge portion towards the trailing edge portion and a suction side rail portion extending along the suction side wall from the leading edge portion to the trailing edge, said pressure side rail portion and suction side rail portion forming a cavity therebetween on the tip surface of the airfoil body;
wherein the squealer tip includes a passage extending between the pressure side rail portion and the suction side rail portion, said passage configured to fluidly couple the trailing edge portion to the cavity; and
wherein the entire pressure side rail portion and the entire suction side rail portion are respectively offset from the pressure side and the suction side of the airfoil body between the leading edge portion and the trailing edge portion, to define a shelf on the tip surface between each of the pressure and suction sides and the pressure side rail portion and the suction side rail portion, respectively, wherein the suction side rail portion of the squealer tip extends to the trailing edge and is coincident with the continuous outer surface only at the trailing edge of the trailing edge portion, and the pressure side rail portion terminates at an end thereof near the trailing edge portion, and defines the passage as a gap between the end of the pressure side rail portion and the suction side rail portion.

2. The turbine blade of claim 1, further comprising at least one opening disposed in the tip surface between the pressure side of the airfoil body and the pressure side rail portion of the squealer tip, wherein the at least one opening is configured to discharge air from the tip surface.

3. The turbine blade of claim 2, wherein the at least one opening is a plurality of openings.

4. The turbine blade of claim 1, further comprising at least one opening disposed in the tip surface between the pressure side rail portion of the squealer tip and the suction side rail portion of the squealer tip, wherein the at least one opening is configured to discharge air from the tip surface into the cavity.

5. The turbine blade of claim 4, wherein the at least one opening is a plurality of openings.

6. The turbine blade of claim 4, wherein the passage is configured to distribute air from the cavity to the trailing edge portion.

7. The turbine blade of claim 1, wherein the squealer tip includes a leading edge rail portion disposed at the leading edge tip portion, and wherein the pressure side rail portion of the squealer tip and the suction side rail portion of the squealer tip are joined together by the leading edge rail portion of the squealer tip.

8. The turbine blade of claim 7, further comprising an opening in the tip surface, wherein the opening is disposed between the leading edge of the airfoil body and the leading edge rail portion of the squealer tip; and wherein the opening is configured to discharge air from the tip surface.

9. The turbine blade of claim 1, wherein the pressure side rail portion extends along a substantial portion of the pressure side but does not extend to the trailing edge.

10. A turbine blade for a gas turbine engine, comprising:
an airfoil body having a pressure side, a suction side, a leading edge portion, and a trailing edge portion, wherein the airfoil body culminates at a tip surface; wherein the pressure side, leading edge portion, suction side, and trailing edge portion collectively form a continuous outer surface of the airfoil body; and
a squealer tip extending outwardly from the tip surface, wherein the squealer tip is configured to define a cavity on the tip surface of the airfoil body and a passage fluidly coupling the cavity with the trailing edge portion;
wherein the squealer tip includes a leading edge rail portion disposed at the leading edge portion joining together a pressure side rail portion that extends along the pressure side between the leading edge portion and the trailing edge portion and a suction side rail portion that extends along the suction side between the leading edge portion and the trailing edge portion, the entire pressure side rail portion offset from the pressure side and the entire suction side rail portion offset from the suction side to define a shelf on the tip surface between each of the pressure and suction side rail portions and the respective pressure and suction sides of the airfoil body, wherein the squealer tip is coincident with the continuous outer surface only at a trailing edge of the trailing edge portion, wherein the passage is defined between a terminal end of the pressure side rail portion and the suction side rail portion near the trailing edge portion of the airfoil body.

11. The turbine blade of claim 10, further comprising a plurality of openings disposed in the tip surface between the pressure side of the airfoil body and the squealer tip, wherein the plurality of openings are configured to discharge air from the tip surface.

12. The turbine blade of claim 10, further comprising a plurality of openings disposed in the tip surface and positioned to discharge air from the tip surface into the cavity.

13. The turbine blade of claim 12, wherein the passage is configured to distribute air from the cavity to the trailing edge portion.

14. The turbine blade of claim 10, wherein the pressure side rail portion extends along a substantial portion of the pressure side but does not extend to the trailing edge.

15. A turbine blade for a gas turbine engine, comprising:
an airfoil body having a pressure side, a suction side, a leading edge portion having a leading edge of the airfoil body, and a trailing edge portion having a trailing edge of the airfoil body, wherein the pressure side, leading edge portion, suction side, and trailing edge portion collectively form a continuous outer surface of the airfoil body, and the airfoil body culminates at a tip surface, the tip surface including a number of openings defined therein; and
a squealer tip extending outwardly from the tip surface, said squealer tip having a pressure side rail portion extending along the pressure side wall from the leading edge portion towards the trailing edge portion and a suction side rail portion extending along the suction side wall from the leading edge portion to the trailing edge, said pressure side rail portion and suction side rail portion forming a cavity therebetween on the tip surface of the airfoil body;

wherein the squealer tip includes a passage extending between the pressure side rail portion and the suction side rail portion, said passage configured to fluidly couple the trailing edge portion to the cavity; and wherein the entire pressure side rail portion and the entire suction side rail portion are respectively offset from the pressure side and the suction side of the airfoil body between the leading edge portion and the trailing edge portion, to define a shelf on the tip surface between each of the pressure and suction sides and the pressure side rail portion and the suction side rail portion, respectively, wherein the suction side rail portion of the squealer tip extends to the trailing edge and is coincident with the continuous outer surface only at the trailing edge of the trailing edge portion, and the pressure side rail portion terminates at an end thereof near the trailing edge portion, and defines the passage as a gap between the end of the pressure side rail portion and the suction side rail portion.

* * * * *